United States Patent
Chang et al.

(10) Patent No.: US 9,748,558 B2
(45) Date of Patent: Aug. 29, 2017

(54) METHOD FOR PREPARING ELECTRODE MATERIALS AND ELECTRODE MATERIALS PRODUCED THEREFROM

(75) Inventors: Chia-Chin Chang, Tainan (TW);
Yu-Chun Chen, Kaosiung (TW);
Chun-Wei Huang, Tainan (TW);
Ru-Shi Liu, New Taipei (TW); Li-Jane Her, Kaohsiung (TW)

(73) Assignee: Taiwan Hopax Chems. Mfg. Co., Ltd., Kaohsiung (TW)

(*) Notice: Subject to any disclaimer, the term of this patent is extended or adjusted under 35 U.S.C. 154(b) by 377 days.

(21) Appl. No.: 14/354,142

(22) PCT Filed: Oct. 25, 2011

(86) PCT No.: PCT/CN2011/081247
§ 371 (c)(1),
(2), (4) Date: Jun. 13, 2014

(87) PCT Pub. No.: WO2013/059988
PCT Pub. Date: May 2, 2013

(65) Prior Publication Data
US 2014/0329149 A1 Nov. 6, 2014

(51) Int. Cl.
*H01M 4/485* (2010.01)
*H01M 4/1391* (2010.01)
(Continued)

(52) U.S. Cl.
CPC ....... *H01M 4/1391* (2013.01); *H01M 4/0402* (2013.01); *H01M 4/045* (2013.01);
(Continued)

(58) Field of Classification Search
None
See application file for complete search history.

(56) References Cited

U.S. PATENT DOCUMENTS 4,373,013 A * 2/1983 Yoshizumi ............... B41M 5/20
106/437
6,746,802 B2 6/2004 Tamura et al.
(Continued)

FOREIGN PATENT DOCUMENTS

| CN | 101504989 A | 8/2009 |
| CN | 101648147 A | 2/2010 |

(Continued)

OTHER PUBLICATIONS

Uchiyama et al., "Lithium insertion into nanometer-sized rutile-type $Ti_xSn_{1-x}O_2$ solid solutions," Solid State Ionics, vol. 180, 2009, pp. 956-960.
(Continued)

*Primary Examiner* — Lucas J. O'Donnell
(74) *Attorney, Agent, or Firm* — Birch, Stewart, Kolasch & Birch, LLP

(57) ABSTRACT

The present invention provides a method for preparing an electrode material, comprising providing an acidic plating bath; adding titanium dioxide in the form of powder, metal salt, and reductant to said acidic plating bath to obtain a precursor; and heat treating said precursor to obtain an electrode material. When the electrode material obtained by said method is applied to batteries, the batteries have not only high capacity, but also long lifetime.

13 Claims, 6 Drawing Sheets

(51) Int. Cl.
*H01M 4/04* (2006.01)
*H01M 4/131* (2010.01)
*H01M 4/36* (2006.01)
*H01M 4/02* (2006.01)

(52) U.S. Cl.
CPC ......... *H01M 4/0471* (2013.01); *H01M 4/131* (2013.01); *H01M 4/366* (2013.01); *H01M 4/485* (2013.01); *H01M 2004/028* (2013.01); *H01M 2220/30* (2013.01); *Y02P 70/54* (2015.11)

(56) References Cited

U.S. PATENT DOCUMENTS

| | | | |
|---|---|---|---|
| 8,518,230 B2* | 8/2013 | Egli | C25D 3/30 205/252 |
| 2009/0042095 A1* | 2/2009 | Inagaki | C01G 23/005 429/92 |
| 2012/0094192 A1* | 4/2012 | Qu | B01J 13/02 429/336 |

FOREIGN PATENT DOCUMENTS

| | | |
|---|---|---|
| JP | H11242954 A | 9/1999 |
| JP | 2000036323 A | 2/2000 |
| JP | 2000268818 A | 9/2000 |
| JP | 2001332254 A | 11/2001 |
| JP | 2002358956 A | 12/2002 |
| JP | 2004206945 A | 7/2004 |
| JP | 2004319469 A | 11/2004 |
| JP | 2005129254 A | 5/2005 |
| JP | 2007080680 A | 3/2007 |
| JP | 2009123379 A | 6/2009 |
| JP | 2010157398 A | 7/2010 |
| WO | 2010013726 A1 | 2/2010 |

OTHER PUBLICATIONS

Shi, Li-yi, et al., "Morphological Structure of SnO2—TiO2 Composite Particles and its Photocatalytic Degradation of Dyeing Solutions", Journal of Chemical Engineering of Chinese Universities, vol. 14, No. 6, pp. 548-552 (Dec. 2000).

Sivashanmugam, Arumugam, et al., "Novel Li4Ti5O12/Sn nanocomposites as anode material for lithium ion batteries", Materials Research Bulletin, vol. 46, pp. 492-500 (2011).

Hao, Yan-Jing, et al., "In situ deposition method prepration of Li4Ti5O12—SnO2 composite materials for lithium ion batteries", Journal of Alloys and Compounds, vol. 462, pp. 404-409 (2008).

Xiong, Li-zhi, et al., "Preparation and characterization of SnO2—Li4Ti5O12 composite by sol-gel technique", Trans. Nonferrous Met. Soc. China, vol. 20, pp. s267-s270 (2010).

Xue, Leigang, et al., "Design and synthesis of Cu6—Sn5-coated TiO2 nanotube arrays as anode material for lithium ion batteries", J. Mater. Chem., vol. 21, p. 3216-20 (2011).

* cited by examiner

METHOD FOR PREPARING ELECTRODE MATERIALS AND ELECTRODE MATERIALS PRODUCED THEREFROM

This application is a U.S. National Stage Application of PCT Application No. PCT/CN2011/081247, with an international filing date of 25 Oct. 2011. The subject matter of this application is incorporated herein.

BACKGROUND

Technical Field

The present invention is related to a method for preparing an electrode material; especially related to a method for preparing a cathode material for lithium ion batteries.

Description of Related Art

The main trend of the demands of the current electronic, informative, bio-medical apparatuses or devices is to be compact and miniaturized. In order to fulfill the demands, the batteries used in those apparatuses and devices are also expected to be smaller but still have the advantages of high is storage capacity and high discharge capacity. Lithium ion batteries have gradually drawn the attention in academic and industrial area as complying with the aforesaid requirements.

The main elements of a lithium ion battery includes an anode ($LiCoO_2$—$LiMn_2O_4$—$LiFePO_4$, etc), an electrolytic solution, a separation membrane, and a cathode (carbon-based material and titanium-based material). The working mechanism of a lithium ion battery is to utilize the oxidation and reduction of the lithium ion between the anode and the cathode to provide charging and discharging reaction. The chemical reaction of the charging and discharging can be summarized as the following formulas; wherein M is referred to as Co, Ni, or Mn; the reaction directs toward right side while charging and left side while discharging:

Reaction at anode: $LiMO_2 \leftrightarrow Li(1-x)MO_2 + xLi^+ + xe^-$

Reaction at cathode: $C_6 + xLi^+ + xe^- \leftrightarrow Li_xC_6$

Net reaction: $LiMO_2 + C_6 \leftrightarrow Li(1-x)MO_2 + Li_xC_6$

In recent researches, several transition-metal oxides have been used as cathodes of lithium ion batteries, such as $MoO_2$, $SnO_2$, $CoO_2$, $CuO$, $FeO$, $Li_4Ti_5O_{12}$, $TiO_2$ and etc. Among them, titanium-based materials such as $TiO_2$ and $Li_4Ti_5O_{12}$ have been widely studied for their properties of stable crystal structure, low volume change upon charging/discharging (less than 0.2%) and excellent life cycle (at least 1500 cycles) and their promising application as cathode materials of lithium ion batteries to replace carbon-based materials. Although the aforesaid titanium-based materials provide better safety, their drawbacks of bad conductivity and lower electrical capacity (about 180 mAh/g) are the first-priority issues to be overcome for being used as the cathodes of lithium ion batteries.

U.S. Pat. No. 6,007,945 disclosed a solid phase reaction to mix $TiO_2$ and $SnO_2$ at various ratios for being used as the cathodes of lithium ion batteries. The ratios of the Ti atom and Sn atom taught in the Patent are Ti:Sn=6:5 ($Ti_6Sn_5$) and 2:1 ($Ti_2Sn_1$) respectively for mixing commercial $TiO_2$ powder and $SnO_2$ powder. Then, the mixture was sintered at 1000° C. and crushed to an average diameter of 15 μm. After that, the powder was combined with 5 wt % of conductive carbon (ex. fine petroleum coke) and adhesives (ex. polyvinylidene fluoride) and blended evenly to form as a working electrode. The obtained working electrode was examined by using $LiCoO_2$ as the counter electrode. The examination results showed that the reversible capacity of $Ti_6Sn_5$ and $Ti_2Sn_1$ is 1130 mA/cm³ and 1110 mA/cm³, respectively (while the density of the electrode is both 3.65 g/cm³). In addition, the initial working voltage of the $LiCoO_2$ battery was 3.5V and maintained at 3.2V after 50 cycles.

An article of Materials Research Bulletin (46 (2011) p. 492-500) disclosed to mix homemade $Li_4Ti_5O_{12}$ and Sn evenly by high energy ball milling to obtain a novel composite of $Sn/Li_4Ti_5O_{12}$. The author taught to mix the quantified organic lithium and titanium dioxide evenly and sintered the same at various temperatures to obtain a composite of Li/Ti/O. According to the experiments, the $Li_4Ti_5O_{12}$ obtained at 800° C. sintering temperature has a purer crystal phase. The Sn nanopowder was obtained by chemically mixing $SnCl_2.2H_2O$ with $NaBH_4$ solvent. Then, the $Li_4Ti_5O_{12}$ was mixed with Sn at various ratios to obtain the $Sn/Li_4Ti_5O_{12}$ mixture. According to the article, $Li_4Ti_5O_{12}$ could reduce the overexpansion problem of Sn upon charging/discharging and Sn was able to provide better conductivity to $Li_4Ti_5O_{12}$ and make the $Sn/Li_4Ti_5O_{12}$ mixture have good cycling stability and high capacity. In the sample of $Li_4Ti_5O_{12}$:Sn=70:30, the initial discharge capacity was 321 mAh/g and maintained at 300 mAh/g after 30 cycles.

An article of Journal Alloys and Compounds (462 (2008) p. 404-409) disclosed to deposit Sn compound to $Li_4Ti_5O_{12}$ by chemical deposition and to obtain a $Li_4Ti_5O_{12}$ composite coating with $SnO_2$ after heating. First of all, $SnCl_2.xH_2O$ was dissolved in ethanol for various ratios. Then, $Li_4Ti_5O_{12}$ and $NH_3.H_2O$ were sequentially added to deposit Sn on the surface of the $Li_4Ti_5O_{12}$ material in the form of an oxide. After that, the material was sintered at 500° C. for 3 hours to obtain a $Li_4Ti_5O_{12}$—$SnO_2$ composite. The data showed that the method can evenly modify the surface of $Li_4Ti_5O_{12}$ with $SnO_2$ and provide the batteries with stable life cycle and electronic capacity. The initial discharge capacity of $Li_4Ti_5O_{12}$ modified with 5 wt % of $SnO_2$ on the surface thereof was 443 mAh/g and maintained at 189 mAh/g after 42 cycles.

An article of Transactions of Nonferrous Metals Society of China (20 (2010) s267-s270) taught the preparation of $SnO_2$—$Li_4Ti_5O_{12}$ composite by a sol-gel process. First of all, tetrabutyl titanate after quantization was dissolved in anhydrous ethanol and added to an ethanol solution containing lithium acetate. After stirring, a powder of $SnO_2$ was added in and the mixture was kept vibrating for 2 to 3 hours by a sonicator. Then, the mixture was dried and sintered at 500° C. for 4 hours to obtain the $SnO_2$—$Li_4Ti_5O_{12}$ composite. The experimental results showed that the $SnO_2$ powder was coated with a layer of amorphous $Li_4Ti_5O_{12}$ and formed a core-shell structure. The structure controlled the volume expansion of $SnO_2$ upon charging and discharging and thereby prevented the material from being collapsed. The composite had a 688.7 mAh/g of reversible capacity upon the initial charging and discharging, and the reversible capacity maintained at 93.4% after 60 cycles, showing that the composite was a cathode material with high capacity and long lifetime.

In light of the foregoing publications, the combination of titanium-based material and tin salts has been widely studied recently. The kind of composite not only can combine the advantages of the two materials but also can minimize the drawbacks thereof so that forms a cathode of good life cycle, high electronic capacity and high safety. However, it is also noted from the aforesaid disclosures that the fabrication of the composite is too complicated and expensive thereby is not ideal for commercialization. Improvement to overcome this matter is in need.

SUMMARY

In light of the foregoing, one of the objects of the present invention is to prepare a solid solution of $SnO_2/TiO_2$ having high electronic capacity, long lifetime, and high safety by a relatively simple and cost-friendly manner. In this way, the fabrication can meet the requirement of commercialization and is helpful to popularize lithium ion batteries in electric vehicle industry so that improve the development of the industry.

In order to achieve the aforesaid objects, the present invention provides a method for preparing an electrode material, comprising: providing an acidic plating bath; adding titanium dioxide, metal salt, and reductant to said acidic plating bath to obtain a precursor; and heating said precursor to obtain an electrode material.

Preferably, said acidic plating bath is composed of an acid and a solvent. Said acid is preferably formic acid, benzoic acid, sulfuric acid, hydrochloric acid, borofluoric acid, acetic acid, nitric acid, or a combination thereof. The solvent is preferably water, alkane, ketone, aldehyde, alcohol, ether, aromatic hydrocarbon, coal oil, or a combination thereof.

Preferably, said acidic plating bath is at a temperature of 40° C. to 100° C.

Preferably, said titanium dioxide is of a crystal phase of rutile, anatase, brookite, or a combination thereof.

Preferably, said metal salt is tin salt, antimony salt, germanium salt, or a combination thereof.

Preferably, said reductant is thiourea, sodium sulfide, sodium thiosulfate, sodium dithionite, or a combination thereof.

Preferably, said method further comprises a drying step before said heating. Said drying is conducted at 60° C. to 120° C. Moreover, said method preferably further comprises a washing step before said drying step.

Preferably, said heating is conducted at 200° C. to 1300° C.

Preferably, said electrode material is used as a cathode.

The present invention also provides an electrode material, comprising plural particles of core-shell structure; wherein said core is titanium dioxide and said shell is a metal salt being reduced and heated and covering on the surface of said core.

Preferably, said titanium dioxide is of a crystal phase of rutile, anatase, brookite, or a combination thereof.

Preferably, said metal salt is tin salt, antimony salt, germanium salt, or a combination thereof.

Preferably, said electrode material is used as a cathode.

Preferably, said shell is a solid solution of $Ti_xSn_{1-x}O_2$ (x is 0-1.0).

Preferably, said electrode material is made by the aforesaid method.

To sum up, the present invention provides a method for preparing an electrode material simply by mixing the required materials to a mixture and conducts a heating treatment on it after drying the same. The present invention is easy-to-operation and is convenient as no specialized apparatuses are required so that is particularly suitable for commercialization and perfectly fits in the requirements of industrial production lines.

DETAILED DESCRIPTION

Figure 1:
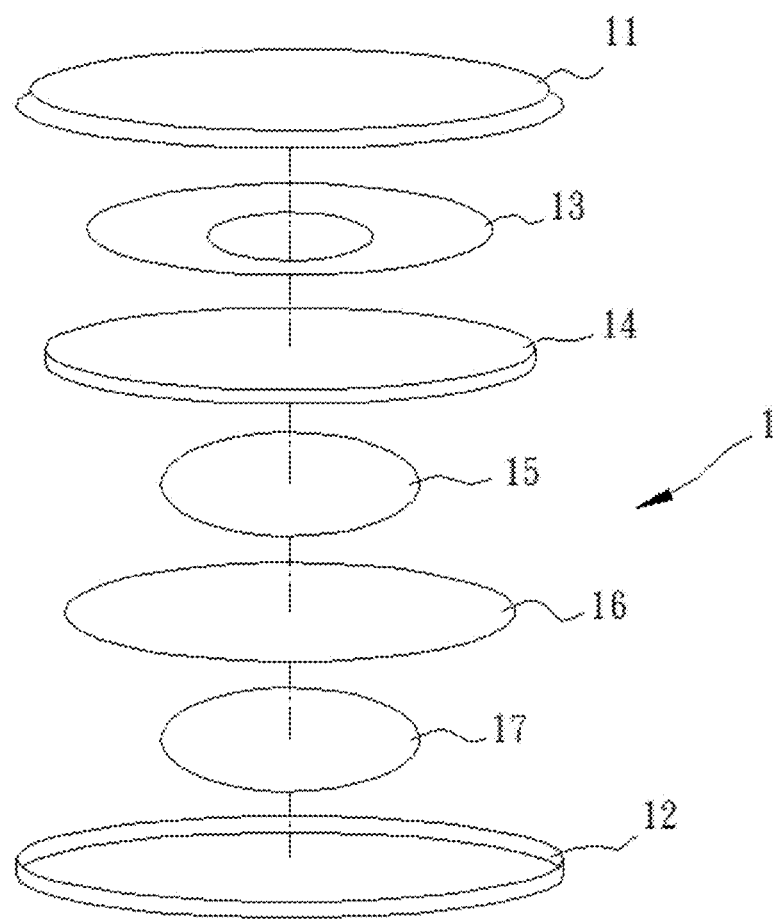
FIG. 1 shows the elements of and positions thereof inside a lithium ion battery.

The present invention provides a simplified method for preparing electrode materials. The electrode made by the present invention can provide the batteries equipping the same high electronic capacity and long lifetime.

The present method for preparing electrode materials comprises: providing an acidic plating bath; adding titanium dioxide, metal salt, and reductant to said acidic plating bath to obtain a precursor; and heating said precursor to obtain an electrode material.

The acidic plating bath of the present invention is composed of an acid and a solvent; wherein the ratio can be those known in the art. Said acidic plating bath can be commercial available products or homemade by operators while practicing the present method. In the present invention, said acid comprises, but not limits to, formic acid, benzoic acid, sulfuric acid, hydrochloric acid, borofluoric acid, acetic acid, nitric acid, or a combination thereof; wherein, said acid is preferably borofluoric acid.

In terms of said solvent, it may be, but not limit to, water, alkane (ex. ethane, propane, or pentane), ketone (ex. acetone, butanone, or N-methyl-2-pyrrolidone), aldehyde (ex. butyl aldehyde), alcohol (ex. methanol, ethanol, propanol, butanol, pentanol, or isopropanol), ether (ex. diethyl ether), aromatic hydrocarbon (ex. benzene, toluene, or xylene), coal oil, or a combination thereof; wherein, said solvent is preferably water.

In terms of the temperature of said acidic plating bath, it is preferably at 40° C. to 100° C.

The crystal phase of the titanium dioxide used in the present invention is not particularly limited. Nevertheless, the crystal phase is preferably rutile, anatase, brookite, or a combination thereof; wherein rutile is more preferable than others.

The metal salts used in the present invention may be, but not limit to, tin salt, antimony salt, germanium salt, or a combination thereof. Said tin salt may be tin dichloride, tin tetrachloride, tin sulphate, tin borofluoride, or a combination thereof. Said antimony salt may be antimony trichloride, antimony sulphate, antimony tetrafluoroborate, or a combination thereof. Said germanium salt may be germanium dichloride, germanium tetrachloride, germanium bromide, or a combination thereof.

The additive amount of said metal salt is not particularly limited as long as the concentration of the metal ion of said metal salt in said acidic plating bath is operated in the saturated region. Preferably, the concentration of the metal ion of said metal salt in said acidic plating bath is 0.01 M to 0.40 M.

It is important to control the relative additive amount between said titanium dioxide and said metal salt while practicing the present invention; therefore, the volume of said acidic plating bath is not limited. In the present method, the relative additive amount of said titanium dioxide and said metal salt is variable depending on several factors while operating, such as the kinds of titanium dioxide and/or surface area thereof, the desired performance of the cathode materials to be made, cost, etc. Accordingly, the relative additive amount of said titanium dioxide and said metal salt shall not be limited. In order to facilitate those having ordinary skill in the art to operate the present invention, the inventors provide the following suggestions of the relative additive amount. Based on every gram of titanium dioxide used, the metal ion releasing from the metal salt in said acidic plating bath is preferably below 0.35M; more preferably, between 0.10M to 0.35M; even more preferably, between 0.20M to 0.25M.

It shall be also noted that the selection and additive amount of said metal salt, said acid, and said solvent in said acidic plating bath are made depending on cost consideration, availability, convenience in operation and/or the desired performance of the batteries to equip the same; therefore, the selection and additive amount are no need to be particularly limited.

Said reductant used in the present invention is not particularly limited as long as said reductant is capable of reducing the metal ions in the reactants and depositing it on the surface of the titanium dioxide material. Case in point, said reductant may be thiourea, sodium sulfide, sodium thiosulfate, sodium dithionite, or a combination thereof. In a preferable embodiment, said reductant is sodium dithionite.

In the present invention, the present method may further comprise a drying step before said heating. Practically, because, the high temperature environment (with temperature higher than room temperature) for said heating can accelerate the remove of said reductant and said acidic plating bath, said heating and said drying can be conducted simultaneously. Said drying step is preferably conducted at 60° C. to 120° C. In order to reduce the content of the impurity in the product precursor, the present method can further comprise a step of washing said product precursor before said drying step.

Generally, said heating of the present invention is preferably conducted at 200° C. to 1300° C.; more preferably, at 350° C. to 700° C.; even more preferably, at 400° C. to 650° C. In terms of the time for heating, those having ordinary skill in the art shall realize that the higher the temperature of the heating is, the shorter the time needs. In other words, the time needing for said heating depends on the temperature of said heating. Typically, the heating time is preferably, 10 minutes to 180 minutes; more preferably, 10 minutes to 120 minutes.

Furthermore, in order to prevent the dried product precursor from being oxidized during said heating, said heating is preferably conducted in an inert gas environment or in an environment having thin gas (that is, an environment having a pressure lower than $10^{-2}$ torr). With regard to the inert gas environment, said inert gas is preferably selected from a group consisting of nitrogen, argon, helium, carbon dioxide, nitrogen dioxide, and a combination thereof. Said inert gas environment shall avoid the existence of moisture and oxygen.

Based on the exemplary conditions set forth, those having ordinary skill in the art shall realize that as long as the present electrode material can be obtained, the temperature and time for heating are not required to be limited at a particular range. In other words, the operators can adjust temperature and time based on factors such as the performance of the apparatus used and the time costs.

By the aforesaid method, an electrode material having high electronic capacity and long lifetime can be obtained. Accordingly, the present invention also provide an electrode material comprising plural core-shell particles; wherein said core is titanium dioxide and said shell is a metal salt being reduced and heated and covering on the surface of said core.

As noted in the preceding paragraphs, the crystal phase of said titanium dioxide is not particularly limited while it is preferably rutile, anatase, brookite, or a combination thereof; wherein, more preferably is rutile.

The term of "metal salt being reduced and heated" used herein is referred to as the resulted metal salt after the originally-added metal salt being reduced and heated; wherein said resulted metal salt may be a metal, a metal compound, or a mixture thereof. In the other hand, whether said metal salt being reduced and heated being a metal, a metal compound, or a mixture thereof depends on the reaction environment. The examples of said metal salt being reduced and heated include, but not limit to: tin, germanium, tin sulfide, tin oxide, antimony trioxide, or germanium oxide. In an alternative embodiment of the present invention, said metal salt being reduced and heated is $Ti_xS_{1-x}O_2$ (x is 0-1.0); that is said shell is $Ti_xSn_{1-x}O_2$ (x is 0-1.0).

The electrode material of the present invention not only can be used for lithium ion batteries, but also can be used in other electrochemical devices. Generally, the present electrode material is preferably used as the cathode material. The present electrode material can provide the batteries equipping the same with advantages such as high safety, high electronic capacity, low capacitive decay rate, long lifetime and stability.

The electrode material of the present invention is further processed by the manners known in the art recited in the following paragraphs to obtain an electrode plate for lithium ion batteries. In an example of the present invention, the electrode material is applied for a cathode plate and collocated with other elements to form a lithium ion battery.

The following paragraphs are to exemplarily describe the structure of lithium ion batteries but shall not be used to limit the scope of the present invention.

Please refer to FIG. 1, a lithium ion battery 1 comprises an upper lid 11 and a bottom lid 12; wherein said upper lid 11 and said bottom lid 12 can form with each other to define an enclosed space (not shown in FIG. 1). Said lithium ion battery 1 also comprises a spring-disc 13, a stainless-steel disc 14, a cathode plate 15, a separation membrane 16 and an anode plate 17 in an order toward said bottom lid 12 as well as an electrolytic solution filled in said enclosed space (not shown in FIG. 1).

It shall be noted that, the present invention can use the spring-disc, the stainless-steel disc, the cathode plate, the separation membrane and the anode plate of any type or material known in the art; and the variance of the types, fabrication, additive amounts of said battery elements have already known in the art. Those having ordinary skill in the art can adjust them based on their own experience and needs; accordingly, the instant specification would not repeat them in details.

The cathode plate was made by mixing the present cathode materials with a conductive material, an adhesive, and a solvent evenly to obtain a paste. The paste was then coated on a sheet of a current collector (in both sides or single side thereof; for the embodiment at issue, the paste was coated in single side of the sheet) and dried to obtain a current collector having one or two coating on surface thereof. In addition, the coating was optionally pressed by a pressing machine to form the cathode plate, which is favorable for modeling, improving the density of the electronic capacity of the batteries equipping with said cathode material, and enhancing the structure of said coating as well as the adhesion between said coating and said current collector. It is noted that the titanium dioxide has relatively-high rigidity so that the material of the rollers of the pressing machine shall be chosen carefully to avoid from damaging the pressing machine.

Those having ordinary skill in the art can vary the type, additive amount, shape of said conductive material, said adhesive, and said current collector based on their knowledge in this field; for instance, said conductive material practically used may be carbon black, carbon nano-fibers, etc. and the additive amount thereof is usually contained 0 to 20 wt % based on the total weight of said cathode material, said conductive material and said adhesive; which means, the conductive material is not always necessary. The thickness of said coating is preferably 20 to 350 μm.

In terms of said adhesive, it is preferable to use an adhesive that is chemically-stable and electrochemically-stable to the electrolytic solution, and the amount thereof is usually contained about 1 to about 10 wt % based on said cathode material. Said adhesive may be fluoropolymer (among this category, polyvinylidene fluoride (PVDF), and polytetrafluoroethylene are commonly used in the field), polyolefine (among this category, polyethylene (PE), polyvinyl alcohol (PVA), styrene-butadiene rubber (SBR) are commonly used in the field), cellulose (among this category, carboxymethylcellulose is commonly used in the field), or a combination thereof.

With regard to said solvent, commonly used solvent is water, N-methyl pyrrolidone, dimethylformamide, alcohol (ex, ethanol, isopropanol) or a combination thereof; wherein water and N-methyl pyrrolidone, especially N-methyl pyrrolidone, are the most common solvent in the field. The variance to the type or amount of said solvent can be made in accordance with the knowledge and demand of those having ordinary skill in the art as there is a lot of relative knowledge accumulated in the field.

Said current collector can be made from copper, nickel, or etc. The shape of said current collector is not limited and is usually in the form of thin layer such as a foil or a reticulation. The size (ex. the length, width, thickness, and weight) of said current collector is decided based on the size of the desired cathode plate while the thickness is preferably 5 to 20 μm.

The fabrication of the anode plate is similar to said cathode plate while using an anode material but said cathode material.

The raw material of said anode material is a transition metal oxide of lithium, for instance, $LiM_{(1-x)}M'_xO_2$ (wherein, x is no larger than 1) or $LiM_{(2-y)}M'_yO_4$ (wherein, y is no larger than 2); M and M' is independently selected from the group consisting of Ti, V, Cr, Mn, Fe, Co, Ni, Zn, Al, and Sn; at least one of M and M' is a transition metal. The fabrication of the aforesaid material can refer to "lithium ion battery" (Central South University, China, May, 2005, $1^{st}$ edition, Chapter 3). Moreover, the raw material of said anode material can comprise two kinds of transition metal oxides of lithium, or comprise other chemical such as lithium carbonate for meeting the performance of the batteries. Also, said anode plate can be a lithium foil.

The main function of said separation membrane is insulation, to prevent batteries from short-circuit for improving safety, and to allow ions passing through the anode plate and the cathode plate. The configuration of the separation membrane is not limited, for instance, solid configurations such as a nonwoven fabric or a porous membrane that are commonly used in the field, or gel configuration which is also usable. The material of said separation membrane may mainly be polyolefine, especially a mixture of polypropene/polyethylene (PP/PE), or polypropene/polyethylene/polypropene (PP/PE/PP); wherein PP/PE/PP is the most common material.

The electrolytic solution suitable for the present invention is a nonaqueous electrolytic solution, which is composed by a nonaqueous solvent and electrolyte dispersing in said solvent. The suitable electrolyte can be the lithium salts commonly used in the field: lithium hexaflourophosphate ($LiPF_6$), lithiumfluoborate ($LiBF_4$), lithium bis(trifluoromethanesulfonyl)imide ($LiN(CF_3SO_2)_2$), lithium trifluoromethylsulphate ($LiCF_3SO_3$), or a combination thereof; wherein, said electrolyte is preferably selected from the group consisting of $LiPF_6$, $LiBF_4$, and a combination thereof. According to the suggestion of the present invention, the concentration of said electrolyte is 0.1 to 2.0 M; preferably, is 0.5 to 1.2 M.

Said nonaqueous solvent of said electrolytic solution can be in the form of solid, gel, or liquid. In terms of the liquid nonaqueous solvent, carbonate (such as, ethylene carbonate, propylene carbonate, dimethyl carbonate, diethyl carbonate, or methylethyl carbonate, etc), furan (such as, terrahydrofuran, etc), ether (such as diethyl ether, etc), thioether (such as, methyl-sulfolane), nitrile (such as, acetonitrile, propanenitrile), or a combination thereof can be used.

Said solid nonaqueous solvent can be a polymer, for instance, selected from ether polymer (such as polyethyleneoxide, and crosslinking thereof), polymethacrylate family polymer, polyacrylate family polymer, fluoropolymer (such as, polyvinylidene fluoride (PVDF), and vinylidene fluoride-hexafluoro propylene copolymer), or a combination thereof.

Said electrolyte is not particularly limited, and it may be lithium salts (such as $LiPF_6$—$LiBF_4$—$LiN(CF_3SO_2)_2$—$LiCF_3SO_3$). The concentration of said electrolyte is 0.1 to 1.5 M; preferably, is 0.5 to 1.2 M.

Said electrolytic solution can be obtained by dissolving an electrolyte in said liquid nonaqueous solvent; but when using a solid nonaqueous solvent, an electrolyte and the solid nonaqueous solvent are mixed by an organic solvent (such as, alkane, ketone, aldehyde, alcohol, ether, benzene, toluene, xylene, coal oil, or a combination thereof) and then heated to remove the organic solvent to obtain an electrolytic solution.

In the examples of the instant specification, the electrolytic solution used is a $LiPF_6$ electrolytic solution of a concentration of 1M; wherein the solvent is a mixture of ethylene carbonate and dimethyl carbonate (1:1 by wt). The separation membrane 16 is PP/PE/PP and the anode plate 17 is a lithium foil.

The technical features of the present invention have been distinctly described in the specification and the other materials and formulations are known in the art; therefore, those having ordinary skill in the art can easily practice the present invention based on the aforesaid information. The examples recited in the following content are exemplary for the features and advantages of the present invention.

Furthermore, unless being specifically indicated, the trials and evaluations subsequently conducted after mixing of the materials of the samples and the comparative samples are conducted at normal temperature and pressure.

EXAMPLES

<Cathode Material for Batteries>
(1) Acid: borofluoric acid, Panreac Applichem, 35.0% purity
(2) Solvent: water.
(3) Titanium dioxide: Ming Yuh Scientific Instruments CO., LTD.
(4) Metal salt: $Sn(BF_4)_2$, Acoros, 50.0% purity.
(5) Reductant: $Na_2S_2O_4$, Ming Yuh Scientific Instruments CO., LTD., 98.2% purity.
(6) Conductive material: carbon black, TIMCAL, Cat. Super-S
<Cathode Plate>
(7) Solvent: N-methyl-2-pyrrolidone (NMP, $C_5H_9NO$), Aldrich, 99.5% purity.
(8) Adhesive: PVDF, Solef, 6020, MW=about 304,000.
(9) Current collector: copper foil, Nippon foil Mfg. Co., Ltd., thickness=15 μm.
<Electrolytic Solution>
(10) Electrolyte: $LiPF_6$, Ferro Corporation, 99.0% purity.
(11) Solvent: ethylene carbonate and dimethyl carbonate, Ferro Corporation, 99.0% purity.
<Other Elements in the Battery>
(12) Upper lid and bottom lid: Hao Ju Corporation, Cat. 2032
(13) Spring-disc: Hao Ju Corporation.
(14) Stainless-steel disc: Hao Ju Corporation.
(15) Separation membrane: Hao Ju Corporation, Cat. Celgard 2300.
(16) Anode plate: lithium foil, FMC Corporation, 99.9% purity, disc of a diameter of 1.65 cm.

[Sample 1]: Preparation of the Present Cathode Material

Borofluoric acid (47.3 mL) and water (485.8 mL) were mixed and the temperature was set at 60° C. to obtain an acidic plating bath. Titanium dioxide (75 g) of rutile phase being de-hydrated at 110° C. for 2 hours, tin borofluoride (49.3 mL), and sodium dithionite (17.41 g) were sequentially added and evenly mixed for 30 minutes to obtain a product precursor. Based on every gram of the added titanium dioxide, the amount of the metal ion in the acidic plating bath is 0.0018 moles.

Next, the product precursor was taken out and washed for several times, and then dried in a 100° C. oven to obtain a solid and dried product precursor. The dried product precursor was then placed in a pot and heated in a high temperature furnace of 450° C. and filled with nitrogen for 120 minutes. After the temperature was gradually decreased, an electrode material was obtained. The obtained electrode material was used as the cathode material of lithium ion batteries.

[Sample 2]: Preparation of the Present Cathode Material

The preparation method was the same as set forth in the Sample 1 but changed the temperature of heating to 500° C.

[Sample 3]: Preparation of the Present Cathode Material

The preparation method was the same as set forth in the Sample 1 but changed the temperature of heating to 600° C.

[Sample 4]: Preparation of the Present Cathode Material

The preparation method was the same as set forth in the Sample 1 but changed the additive amount of titanium dioxide to 37.5 g and changed the temperature of heating to 500° C. Based on every gram of the added titanium dioxide, the amount of the metal ion in the acidic plating bath is 0.0036 moles.

[Sample 5]: Preparation of the Present Cathode Material

The preparation method was the same as set forth in the Sample 1 but changed the additive amount of titanium dioxide to 37.5 g and changed the temperature of heating to 600° C. Based on every gram of the added titanium dioxide, the amount of the metal ion in the acidic plating bath is 0.0036 moles.

[Comparative Sample 1]: Preparation of the Present Cathode Material

Titanium dioxide (75 g) of rutile phase was de-hydrated at 110° C. for 2 hours to obtain a conventional cathode material.

[TEM and XRD Analysis]

The cathode materials prepared in the preceding paragraphs was examined by Transmission electron microscopy (TEM) and X-ray diffraction (XRD; Rigaku Corporation, USA, Cat. ATX-E). The results were shown in FIGS. 2 to 5.

Figure 2:
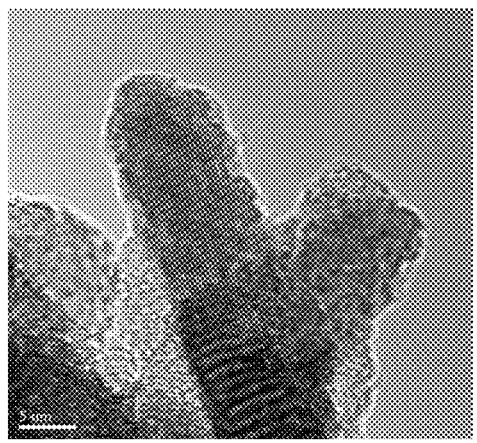
FIG. 2 shows a transmission electron microscope (TEM) figure that shows the surface of the cathode material of Sample 1.
Figure 3:
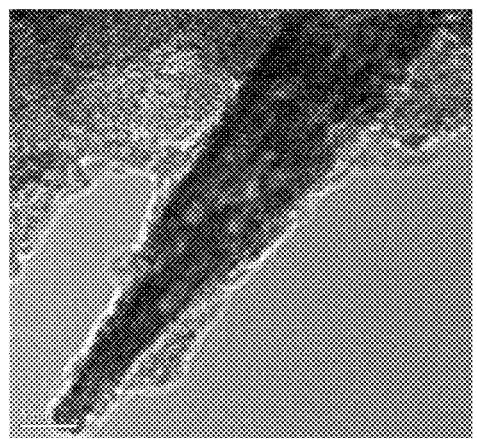
FIG. 3 shows a transmission electron microscope (TEM) figure that shows the surface of the cathode material of Comparative sample 1.

FIG. 2 and FIG. 3 showed a TEM photo respectively, comparing the surface topography of the cathode materials of Sample 1 and Comparative sample 1. According to the results, the surface topography of Sample 1 and Comparative sample 1 is significantly different in that the surface topography of Sample 1 is cylindrical and that of Comparative sample 1 is acicular. The difference may be resulted from the metal ion of the metal salt after being reduced and heated on the surface of titanium dioxide. It proved that the present electrode material is a core-shell structure with the core being titanium dioxide and shell being $Ti_xSn_{1-x}O_2$. Besides, the cathode materials of Samples 2 to 5 were similar with what shown in FIG. 3.

Figure 4:
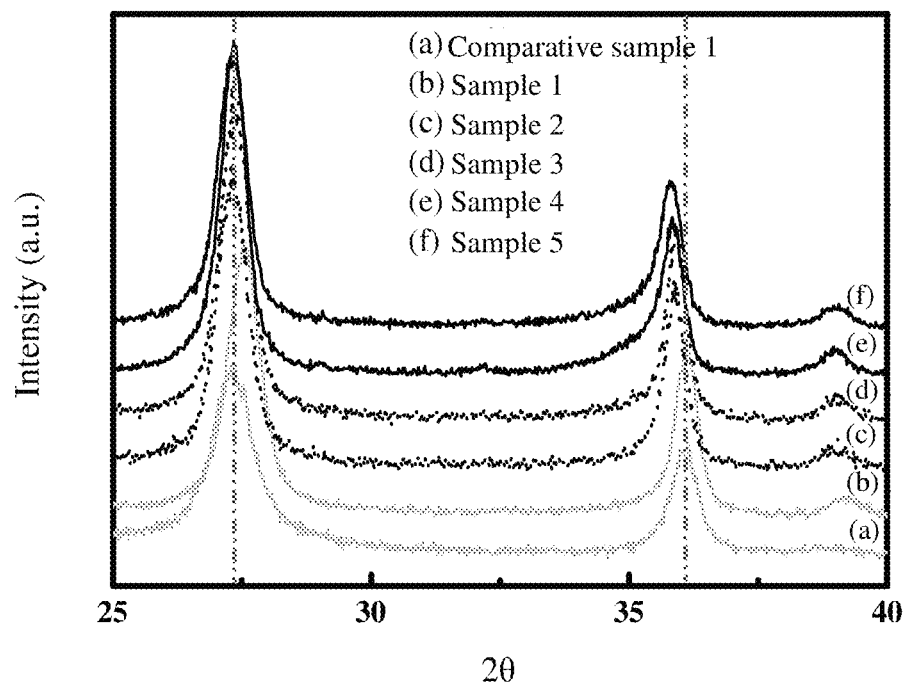
FIG. 4 shows a result of X-ray Diffraction (XRD) displaying the crystal phase change of Samples 1 to 5 and Comparative sample 1.
Figure 5:
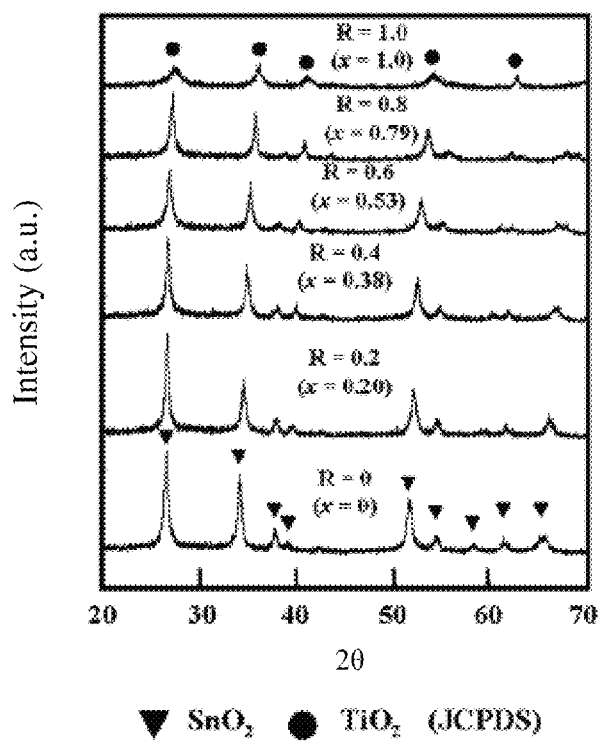
FIG. 5 shows a result of X-ray Diffraction (XRD) of $Ti_xSn_{1-x}O_2$ solid solution, which is cited from H. Uchiyama, E. Hosono, H. Zhou, H. Imai, *Solid State Ionics*, 180 (2009) 956-960.

FIG. 4 displayed the results of XRD, showing the change of crystal phase of the cathode materials of Samples 1 to 5 and Comparative sample 1. As noted in FIG. 4, there was a difference noted between the XRD results of Samples 1 to 5 and Comparative sample 1. In comparison with the Comparative sample 1, there was a peak shift of Samples 1 to 5. The result was consistent with the data disclosed in Solid State Ionics, 180 (2009) 956-960 (please refer to FIG. 5 of the present invention). The article of Solid State Ionics was incorporated in the instant specification as reference. The article recited that the peak of a solid solution of $Ti_xSn_{1-x}O_2$ (x is 0-1.0) in a XRD spectrum would shift alone with the factor "x". When the amount of Sn increased, the peak would move toward less angle, which was consistent with the results displayed in FIG. 4 and proved that the present electrode material is a composite of solid solution.

[Applications]: The Preparation of the Present Lithium Ion Battery

The cathode materials of Samples 1 to 5 and Comparative sample 1 were respectively mixed with carbon black (that is, the conductive material) and PVDF (that is, the adhesive) at a weight ratio of 60:20:20 to obtain a solid composition. Then, N-methyl-2-pyrrolidone contained 20 wt % of said solid composition was mixed with said solid composition evenly to obtain a paste.

The paste of every samples and comparative sample was respectively coated on a side of a copper foil and scraped off by a 250 μm scraper to obtain a thickness of 250 μm of said copper foil and said paste. Said copper foil and said paste were then placed in a 110° C. oven (Wah Fu Precision Co) to remove any residual NMP. After 2 hours, an electrode plate was obtained and cut into discs having a diameter of 16 mm by a pressing machine; that is the cathode plate 15 of said lithium ion battery 1 shown in FIG. 1.

Please refer to FIG. 1, an upper lid 11, a bottom lid 12, a spring-disc 13, a stainless-steel disc 14, a separation membrane 16, an anode plate 17 and an electrolytic solution (1M of $LiPF_6$ electrolytic solution; wherein the solvent is ethylene carbonate and dimethyl carbonate mixed at a weight ratio of 1:1) were all prepared for every cathode plate 15 prepared as set forth. The aforesaid elements were assembled by a battery hooding machine (Hao Ju Corporation, in order to ensure the battery is properly sealed) in a glove box (Unilab Mbraum Corporation, Cat. Proj-4189) according to the order shown in FIG. 1 to obtain a coin cell; that is, the lithium ion battery.

[Performance]

The following trials were conducted to test the performance of the lithium ion batteries equipping the cathode materials of the aforesaid samples and comparative sample:

[Tests for Initial Charging/Discharging]

A charge/discharge testing machine (Acutech Systems Co., Ltd., Cat. BAT-750B) was used for charging every lithium ion battery at constant-current charge of 0.326 mA $cm^{-2}$ (about 0.1 C) until the machine indicated that the voltage of said batteries was 0.1 V then the initial charge electronic capacity of said batteries was obtained. After 5 minutes, a constant-current discharge of every battery was conduct at 0.326 mA $cm^{-2}$ until the voltage thereof reached 3.0 V then the initial discharging electronic capacity of said batteries was obtained. Next, the initial charge/discharge efficiency was calculated by the following equation.

$$\text{Initial charge/discharge efficiency (\%)} = \frac{\text{Initial charge electronic capacity}}{\text{Initial discharge electronic capacity}} \times 100$$

Besides, the initial charge electronic capacity of every battery was divided by the weight of titanium dioxide of the cathode plate thereof to obtain the charging/discharge capacity (mAh/g) averaged to every gram of the cathode material of the aforesaid Samples and Comparative sample. The initial charge/discharge efficiency (%) and charging/discharge capacity (mAh/g) of the aforesaid Samples and Comparative sample were listed in table 1.

[Tests for 50 Times of Charging/Discharging]

The tests of this section were to repeat the aforesaid tests for the initial charging/discharging for 50 times; wherein every repeat had a 5 minutes interval there between. In this way, fifty values of the charging/discharge capacity of the battery were obtained. It was noted that the capacity of the titanium dioxide material was stabilized after the fifth charging/discharging; therefore, the cycling property of every battery was calculated with the $50^{th}$ discharge capacity by the following equation.

$$\text{Cycling characterisitics (\%)} = \frac{\text{the } 50^{th} \text{ discharge capacity}}{\text{the } 5^{th} \text{ discharge capacity}} \times 100$$

Besides, the $50^{th}$ discharging electronic capacity of every battery was divided by the weight of titanium dioxide of the cathode plate thereof to obtain the discharge capacity (mAh/g) averaged to every gram of the cathode material of the aforesaid Samples and Comparative sample. The $50^{th}$ discharge capacity and cycling characteristics (%) of the batteries made by using the aforesaid Samples and Comparative sample were listed in table 1.

TABLE 1

| Operation | titanium dioxide | Heating temperature | Additive amount of the titanium dioxide used in the plating bath | $1^{st}$ charge/discharge capacity | Initial discharging efficiency | $5^{th}$ discharge capacity | $50^{th}$ discharge capacity | $50^{th}$ cycling characteristics |
|---|---|---|---|---|---|---|---|---|
| Comparative Sample | rutile | none | none | 191.2/652.6 | 29.3 | 150.3 | 127.0 | 84.5 |
| Sample 1 | rutile | 450° C. | 75 | 273.6/683.3 | 40.0 | 251.4 | 174.1 | 69.3 |
| 2 | rutile | 500° C. | 75 | 310.8/677.7 | 45.9 | 284.8 | 216.2 | 75.9 |
| 3 | rutile | 600° C. | 75 | 346.8/718.1 | 48.3 | 295.0 | 197.3 | 66.9 |
| 4 | rutile | 500° C. | 37.5 | 312.1/622.1 | 50.2 | 389.2 | 320.8 | 82.4 |
| 5 | rutile | 600° C. | 37.5 | 391.5/728.9 | 53.7 | 400.4 | 345.4 | 86.3 |

The initial discharge capacity ("$1^{st}$ discharge capacity"), the fifth discharge capacity ("$5^{th}$ discharge capacity"), the fiftieth discharge capacity ("$50^{th}$ discharge capacity"), discharging efficiency, and the fiftieth cycling characteristics ("$50^{th}$ cycling characteristics) of every Samples and Comparative sample in table 1 were listed in table 2. By Comparing with the Comparative sample with the same titanium dioxide, the mark "+" indicated in the data showed that the data concerned of the Sample was higher than that of the Comparative sample.

TABLE 2

|  | $1^{st}$ discharge capacity | $5^{th}$ discharge capacity | $50^{th}$ discharge capacity | Initial discharging efficiency | $50^{th}$ cycling characteristics |
|---|---|---|---|---|---|
| Comparative sample | — | — | — | — | — |
| Sample 1 | +82.4 | 101.1 | +47.1 | +10.7 | −15.2 |
| Sample 2 | +119.6 | 134.5 | +89.2 | +16.6 | −8.6 |
| Sample 3 | +155.6 | 144.7 | +70.3 | +19.0 | −17.6 |
| Sample 4 | +120.9 | 238.9 | +193.8 | +20.9 | −2.1 |
| Sample 5 | +200.3 | 250.1 | +218.4 | +24.4 | +1.8 |

According to the above-recited tests for the Samples (as shown in tables 1 and 2), the present cathode materials have better initial discharge capacity, the $50^{th}$ discharge capacity, discharging efficiency than that of the Comparative sample having untreated rutile titanium dioxide; in addition, the $50^{th}$ cycling characteristics of the present cathode materials also showed good stability.

Figure 6:
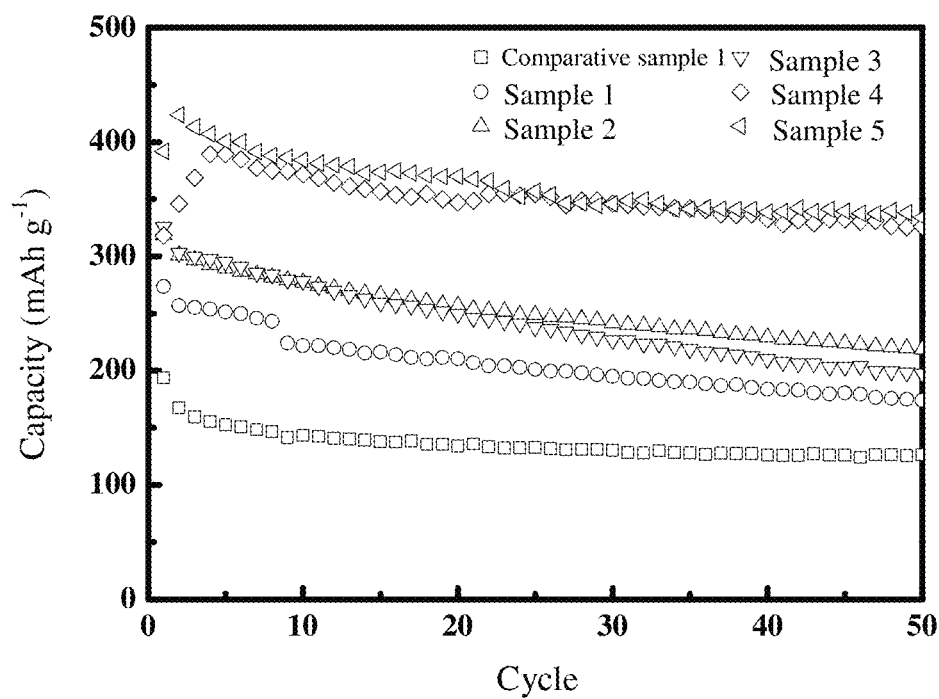
FIG. 6 shows a trial to the life cycles of batteries having cathode materials of Samples 1 to 5 and Comparative Sample 1. The trial recorded the discharge capacity of said batteries of every charging/discharging for fifty times.

The values of the fifty times of discharge capacity of the aforesaid batteries were arranged in FIG. 6, showing the pros and cons of every battery. According to FIG. 6, after 50 times of cycling tests, the batteries using the cathode materials of Samples 1 to 5 had larger discharge capacity and although the decay thereof was slightly more obvious than that of the Comparative sample, the charging/discharge capacity of every repeat was still able to maintain at curtain level. Therefore, it was believed that the batteries using the Samples 1 to 5 have more stable performance and longer lifetime.

In light of the foregoing, by using the present cathode material, the lithium ion battery can have high discharge capacity and provide electricity successively for a long time period. Moreover, the batteries can maintain at high discharge capacity even after long term usage, indicating the lifetime thereof was improved. Furthermore, the cathode materials were made from titanium dioxide material, which has been recognized of high safety. Accordingly, the present cathode materials meet the needs of the market in all aspects.

To sum up, the present method is easy-to-operated as no particular apparatus and materials are required. In addition, the obtained cathode material can be used right away without further purification, which means the cost for preparation can be lowered. Therefore, the present invention indeed can provide the possibility to prepare a suitable cathode material and then assemble a battery with high safety, large discharge capacity and long lifetime at low cost; therefore creates significant benefits for the industry.

What is claimed is:

1. A method for preparing an electrode material, comprising:
   providing an acidic plating bath;
   adding titanium dioxide, metal salt, and reductant to said acidic plating bath to obtain a precursor; and
   heating said precursor to obtain an electrode material,
   wherein said heating is conducted in an inert environment,
   wherein said reductant is sodium sulfide, sodium thiosulfate, sodium dithionite, or a combination thereof,
   wherein said electrode material comprises plural particles of core-shell structure, and
   wherein said core is titanium oxide and said shell is a solid solution of $Ti_xSn_{1-x}O_2$.

2. The method of claim 1, wherein said acidic plating bath is composed of an acid and a solvent.

3. The method of claim 2, wherein said acid is formic acid, benzoic acid, sulfuric acid, hydrochloric acid, borofluoric acid, acetic acid, nitric acid, or a combination thereof.

4. The method of claim 2, wherein said solvent is water, alkane, ketone, aldehyde, alcohol, ether, aromatic hydrocarbon, coal oil, or a combination thereof.

5. The method of claim 1, wherein said acidic plating bath is at a temperature of 40° C. to 100° C.

6. The method of claim 1, wherein said titanium dioxide is of a crystal phase of rutile, anatase, brookite, or a combination thereof.

7. The method of claim 1, wherein said metal salt is tin salt, antimony salt, germanium salt, or a combination thereof.

8. The method of claim 1, further comprising a drying step before said heating.

9. The method of claim 8, wherein said drying is conducted at 60° C. to 120° C.

10. The method of claim 8, further comprising a washing step before said drying step.

11. The method of claim 1, wherein said heating is conducted at 400° C. to 1300° C.

12. The method of claim 1, wherein said electrode material is used as a cathode.

13. The method of claim 1, wherein said inert environment is selected from a group consisting of nitrogen, argon, helium, carbon dioxide, nitrogen dioxide, and a combination thereof.

* * * * *